United States Patent [19]

Nagoshi

[11] Patent Number: 4,803,525

[45] Date of Patent: Feb. 7, 1989

[54] VARIABLE MAGNIFICATION COPYING MACHINE

[75] Inventor: Mitsuru Nagoshi, Hachioji, Japan

[73] Assignee: Konishiroku Photo Industry Company Ltd., Shinjuku, Japan

[21] Appl. No.: 933,416

[22] Filed: Nov. 21, 1986

[30] Foreign Application Priority Data

Dec. 3, 1985 [JP] Japan ................................ 60-271894

[51] Int. Cl.[4] ...................... G03B 27/52; G03G 15/28

[52] U.S. Cl. ........................................... 355/55; 355/8

[58] Field of Search ................................ 355/8, 55, 56

[56] References Cited

U.S. PATENT DOCUMENTS 4,116,561 9/1978 Knechtel et al. ........................ 355/8
4,474,461 10/1984 Tokuhara .............................. 355/56
4,571,063 2/1986 Horiuchi et al. ....................... 355/8

FOREIGN PATENT DOCUMENTS 107027 6/1985 Japan ...................................... 355/56

*Primary Examiner*—A. T. Grimley
*Assistant Examiner*—Ed Pipala
*Attorney, Agent, or Firm*—Schwartz & Weinrieb

[57] ABSTRACT

A variable magnification copying machine for guiding light reflected from an original onto a photosensitive body through means of a plurality of mirrors and a lens system and for forming a latent image of the original upon the photosensitive body includes a variable magnification optical apparatus. The variable magnification optical apparatus selects one of at least two variable magnification modes based upon U variable and U fixed systems in each one of at least two regions obtained by dividing a variable magnification range and varies the magnification by a combination of the variable magnification modes. The variable magnification mode based upon the U variable system changes the optical path length from a surface of the original to the photosensitive body so as to vary the magnification while maintaining the focal length of the lens system constant. The variable magnification mode based upon the U fixed system changes the focal length of the lens system so as to vary the magnification while maintaining the optical path length constant.

12 Claims, 2 Drawing Sheets

VARIABLE MAGNIFICATION COPYING MACHINE

BACKGROUND OF THE INVENTION

1. Field of the Invention

The present invention relates to a variable magnification copying machine and, more particularly, to a variable magnification copying machine capable of widening the magnification range without unduly extending the optical path length.

2. Description of the Prior Art

Copying machines for varying the magnification of an image of an original (to be referred to hereinafter as a variable magnification copying machine) have been popular in recent years. Two variable magnification schemes are available for conventional variable magnification copying machines. One system is a U variable system wherein the focal length of a lens system is fixed, and the optical path length U extending from an original surface to an image forming plane is changed to vary the magnification, as described in Unexamined Patent Publication (Kokai) No. 58-40518. The other system is a U fixed system wherein the optical path length U extending from the original surface to the image forming plane is fixed, and the focal length of the lens system is changed to vary the magnification, as described in Unexamined Patent Publication (Kokai) No. 59-2026.

In the conventional U variable system, the optical path length must be changed until a desired magnification is obtained. If the variable range of magnifications, that is, the variable magnification range is widened, the optical system inevitably becomes bulky. In the conventional U fixed system, the focal length of the lens system must be changed until a desired magnification is obtained.

If the variable range of magnifications, that is, the variable magnification range is widened, the number of lenses constituting the lens system must be increased. In addition, the diameter of the lenses is also increased. As a result, the optical system inevitably becomes bulky. As an end result, in either system, when the variable magnification range is widened, the optical systems of the conventional U fixed and U variable systems are inevitably characterized by a large size. As a result, the copying machine becomes undesirably bulky.

OBJECT OF THE INVENTION

It is an object of the present invention to provide a compact variable magnification copying machine capable of reducing the size of the optical system while maintaining a wide variable magnification range.

SUMMARY OF THE INVENTION

In order to achieve the above object of the present invention, the variable magnification range of the copying machine is divided into two regions, and a variable magnification mode of a U variable system for varying the optical path length from the original surface to the image forming plane and a variable magnification mode of a U fixed system for varying the focal length of the lens system are selectively used in the respective regions.

BRIEF DESCRIPTION OF THE DRAWINGS

Various other objects, features, and attendant advantages of the present invention will be more fully appreciated as the same becomes better understood from the following detailed description of the invention, when considered in connection with the accompanying drawings, in which like reference characters designate like or corresponding parts throughout the several views, and wherein.

DETAILED DESCRIPTION OF THE PREFERRED EMBODIMENTS

Figure 1:
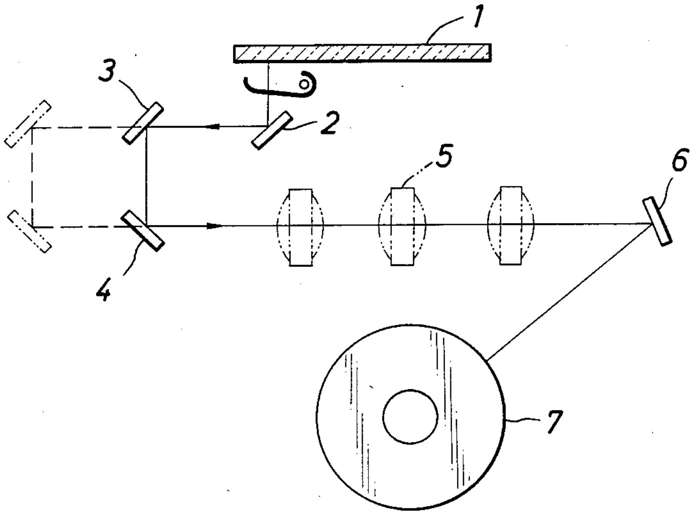
FIG. 1 is a schematic diagram of a variable magnification optical apparatus in a variable magnification copying machine according to an embodiment of the present invention.

FIG. 1 shows a variable magnification optical apparatus incorporated within a variable magnification copying machine according to a first embodiment of the present invention. The variable magnification optical apparatus has an optical path extending from an original table 1 to the outer surface of a photosensitive drum 7 through first, second, and third mirrors 2, 3, and 4, a lens system 5, and a fourth mirror 6. The second and third mirrors 3 and 4 can be integrally displaced along the optical axis. The lens system 5 can be displaced along its optical axis upon displacement of the second and third mirrors 3 and 4. The focal length of the lens system 5 can be varied according to a zoom lens system for changing the distances between the lenses constituting the optical system 5 or an attachment lens system for selectively using a proper attachment lens as shown in FIG. 4 of the present application drawings which corresponds to FIG. 3 of U.S. Pat. No. 4,060,324 wherein lenses 6 and 7 of the noted patent are of different magnifications for use as alternative or attachment lenses.

A variable magnification mode based upon a front path scheme in the U variable system or a variable magnification mode based upon the U fixed system is selectively used according to the selected magnification. In the front path scheme, the distance between the original surface and the optical system is changed. More specifically, while the focal length of the lens system 5 is fixed, the second and third mirrors 3 and 4 are displaced so as to change the optical path length and the lens system 5 is accordingly displaced to vary the magnification. In the variable magnification mode based upon the U fixed system, while the second and third mirrors 3 and 4 are fixed in position so as to maintain the optical path length constant, the focal length of the lens system 5 is changed so as to vary the magnification.

The operation of the variable magnification optical apparatus will now be described.

If the magnification falls within the range of 0.65× to 1.55×, the variable magnification mode based upon the U variable system is set. However, if the magnification is less than 0.65× or more than 1.55×, the variable magnification mode based upon the U fixed system is set.

Figure 2:
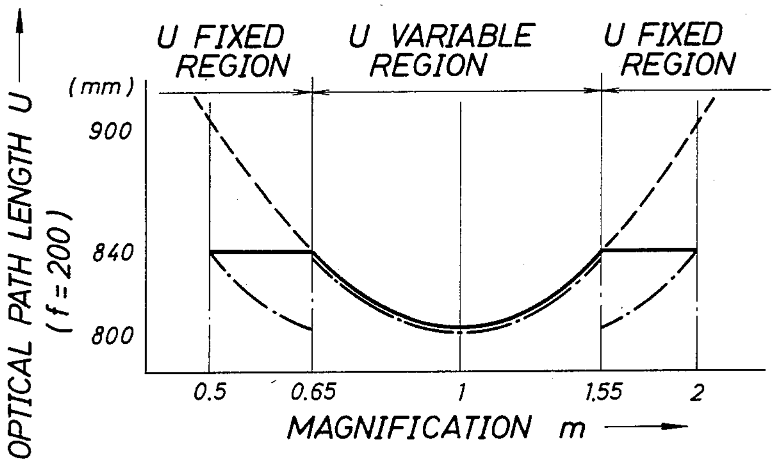
FIG. 2 is a graph showing the optical path length as a function of magnification in the variable magnification optical apparatus of FIG. 1.

If the lens system 5 is arranged according to a zoom lens system, the optical path length U ($U=f(1/m+m+2)$ for f=200, where f is the focal length of the lens system 5 and m is the magnification) falls within the range of 800 mm to 840 mm in the U variable region, as indicated by the solid line in FIG. 2. The optical path length U is maintained at 840 mm within the U fixed region. The optical path length therefore falls within the range of 800 mm to 840 mm within all the variable magnification regions including both the U fixed and U variable regions.

If the lens system 5 employs an attachment lens system, the lens' focal lengths are respectively changed at the magnification points of 1.55× and 0.65× so as to shorten the optical path length U, thereby substantially narrowing the U variable region, as indicated by the alternate long and short dashed line in FIG. 2. Therefore, the optical path length U falls within the range of 800 mm to 840 mm within all variable magnification regions.

However, if all variable magnification ranges are determined according to the U variable system, the optical path length U is abruptly increased at magnifications of less than 0.65× and more than 1.55×, as indicated by the broken line in FIG. 2. If magnifications are 0.5× and 2×, the optical path length U reaches approximately 900 mm.

If the lens system 5 employs either the zoom or attachment lens system, the variable range of the optical path length can be narrowed by means of a combination of the variable magnification modes based upon the U fixed and U variable systems. As a result, the optical system can be made compact.

Figure 3:
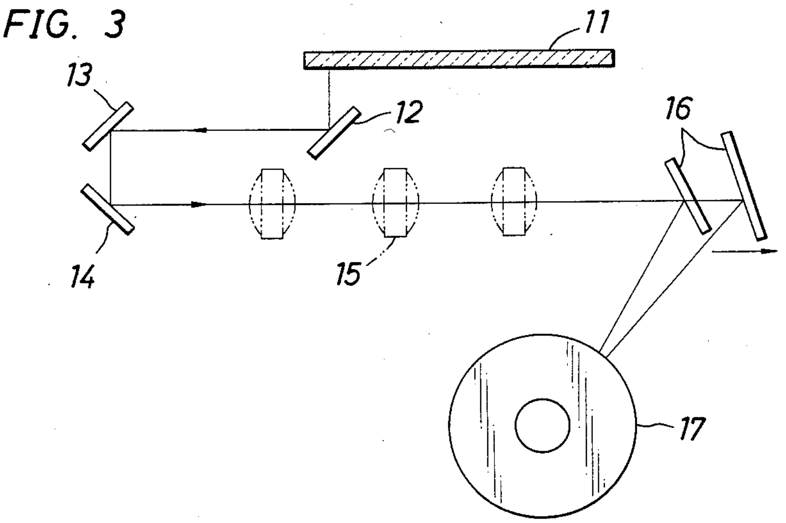
FIG. 3 is a schematic diagram of a variable magnification optical apparatus in a variable magnification copying macine according to another embodiment of the present invention.
Figure 4:
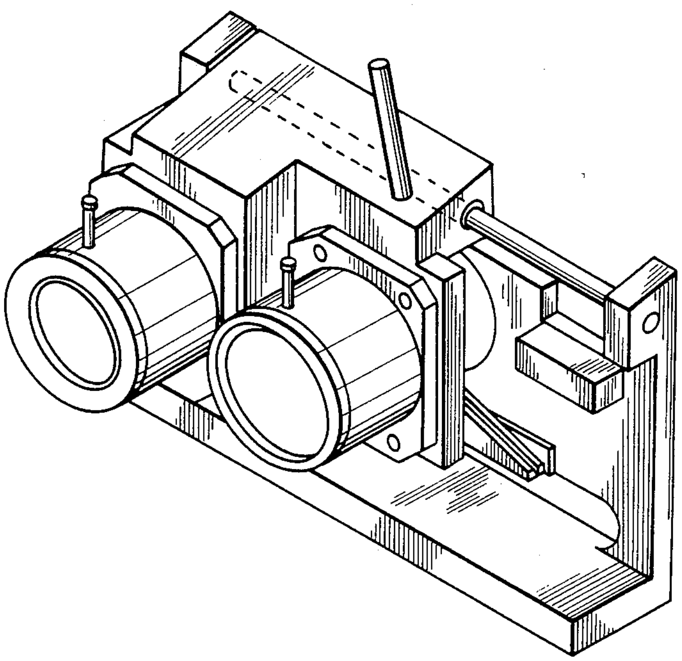
FIG. 4 PRIOR ART
FIG. 4 is an example of a PRIOR ART attachment lens system.

FIG. 3 shows a variable magnification optical apparatus within a variable magnification copying machine according to another embodiment of the present invention. The variable magnification optical apparatus has an optical path extending from an original table 11 to the outer surface of a photosensitive drum 17 through means of first, second and third mirrors 12, 13, and 14, a lens system 15, and a fourth mirror 16. The fourth mirror 16 can be displaced along its optical path. The angle of the fourth mirror 16 can be changed and the lens system 15 can be displaced along its optical axis, upon displacement of the fourth mirror 16, so as to maintain the exposure position unchanged upon the outer surface of the photosensitive drum 17. The focal length of the lens system 15 is changed by means of a zoom lens system for changing the distances between the lenses constituting the lens system 15 or an attachment lens system for selectively using a proper attachment lens.

A variable magnification mode based upon a rear path scheme within the U variable system or a variable magnification mode based upon the U fixed system is selectively used according to the ranges of magnifications. In the rear path scheme, the optical path length between the lens system and the surface of the photosensitive drum is varied. More specifically, while the focal length of the lens system 15 is fixed, the fourth mirror 16 is displaced so as to change the optical path length. Upon displacement of the fourth mirror 16, its angle is changed, and at the same time the lens system 15 is displaced. In the variable magnification mode based upon the U fixed system, the fourth mirror 16 is fixed so as to maintain the optical path length unchanged. At the same time the focal length of the lens system 15 is changed so as to hence vary the magnification.

The operation of the variable magnification optical apparatus in this embodiment is substantially the same as that of FIG. 1. As is apparent from FIG. 2, even if the lens system 15 employs either the zoom lens system or the attachment system, the variable magnification modes of the U variable and U fixed systems are combined so as to narrow the variable range of the optical path length, thereby obtaining a compact optical system.

The above embodiments exemplify the case wherein the variable magnification range within the copying machine is classified into two variable magnification ranges. However, the range may be classified into three or more variable magnification ranges. Even if the range is classified into two variable magnification ranges, it may be divided into upper and lower regions with respect to a predetermined variable magnification as a reference. In each one of a plurality of variable magnification regions, selection of the variable magnification mode based upon the U variable or U fixed system is arbitrarily determined in favor of design.

Obviously, many modifications and variations of the present invention are possible in light of the above teachings. It is therefore to be understood that within the scope of the appended claims, the present invention may be practiced otherwise than as specifically described herein.

What I claim is:

1. A variable magnification system capable of achieving any magnification throughout a variable magnification range, comprising:

means defining an original object;

means upon which an image of said original object is to be formed;

mirror means, and lens means defining a plurality of focal lengths, interposed between said original object means and said image-forming means, for defining an optical path between said original object means and said image-forming means which is variable in length; and means for varying said optical path length while fixing said focal length of said lens means at a predetermined one of said plurality of focal lengths within a first predetermined portion of said variable magnificaton range so as to achieve any one of said magnification values within said first predetermined portion of said variable magnification range, and for fixing said optical path length at a predetermined value while varying said focal length of said lens means during a second predetermined portion of said variable magnification range so as to achieve any one of said magnification values within said second predetermined portion of said variable magnification range.

2. A system according to claim 1, wherein:

said first predetermined portion of said variable magnification range comprises a region between first and second magnifications, said first magnification being smaller than said second magnification, and said second predetermined portion of said variable magnification range comprises a region with magnifications smaller than said first magnification and a region with magnifications larger than said second magnification.

3. A system according to claim 1, wherein:

said optical path length variable system is based upon a front path scheme.

4. A system as set forth in claim 3, wherein:

said mirror means comprises a plurality of mirrors; and at least one of said mirrors is movably displaceable along said optical path so as to vary said optical path length.

5. A system according to claim 1, wherein:

said optical path length variable system is based upon a rear path scheme.

6. A system as set forth in claim 5, wherein:

said mirror means comprises a plurality of mirrors; and at least one of said mirrors is movably displaceable along said optical path so as to vary said optical path length.

7. A system as set forth in claim 6, wherein:

said at least one mirror is angularly displaceable relative to said optical path length.

8. A system as set forth in claim 1, wherein:

said system is disposed within a photocopying machine.

9. A system as set forth in claim 8, further comprising:

a platen table for supporting said original object;

said original object comprises an original document to be photocopied; and said image forming means comprises a photosensitive drum.

10. A system as set forth in claim 1, wherein:

said mirror means comprises a plurality of mirrors; and at least one of said mirrors is movably displaceable along said optical path so as to vary said optical path length.

11. A system according to claim 1, wherein said lens system is a zoom lens system.

12. A system according to claim 1, wherein said lens system is an attachment lens system.

* * * * *